Figure 8:
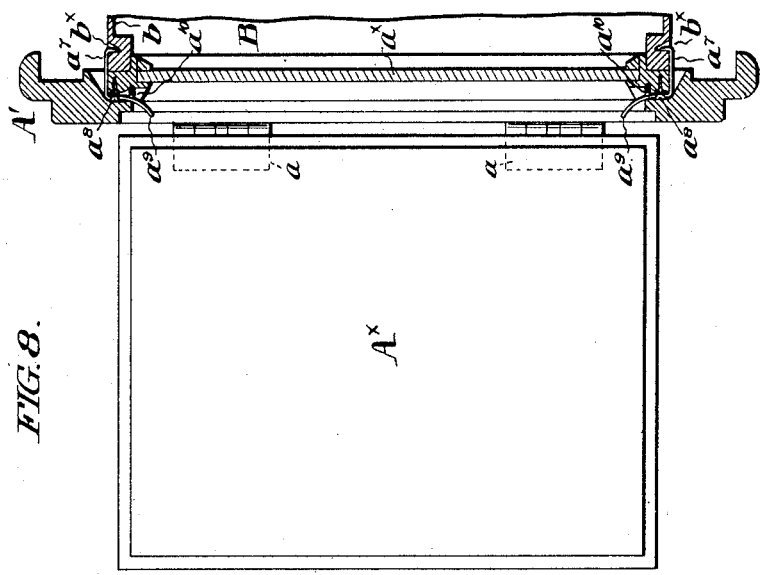

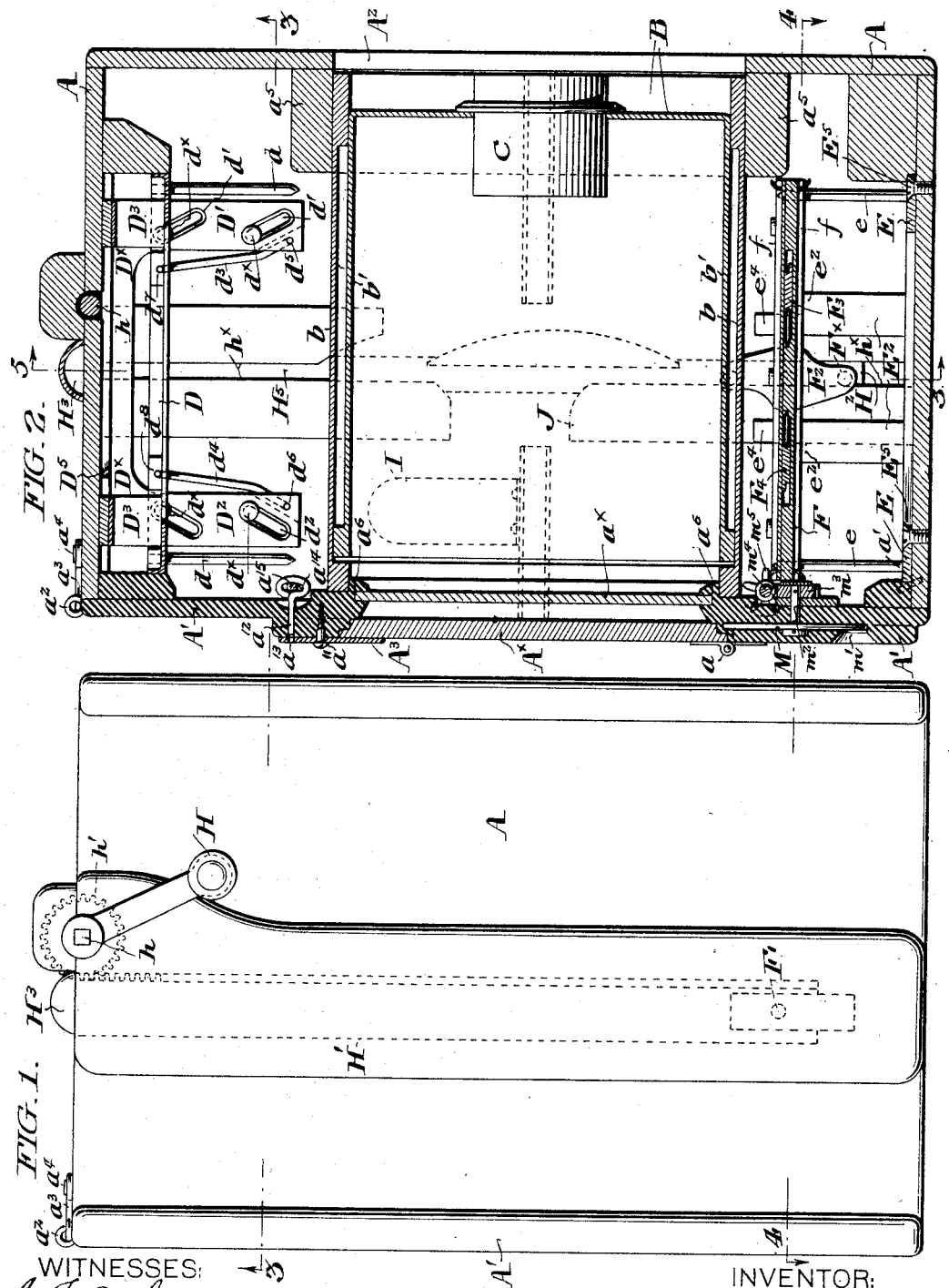

No. 621,447. Patented Mar. 21, 1899.
W. H. DOERING.
MAGAZINE CAMERA.
(Application filed Aug. 25, 1897.)
(No Model.) 8 Sheets—Sheet 2.
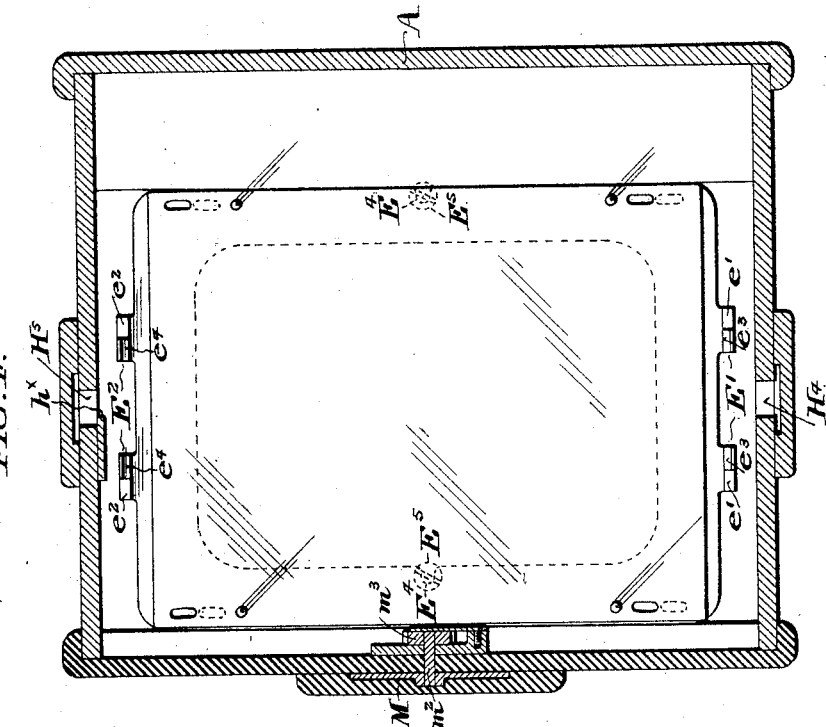
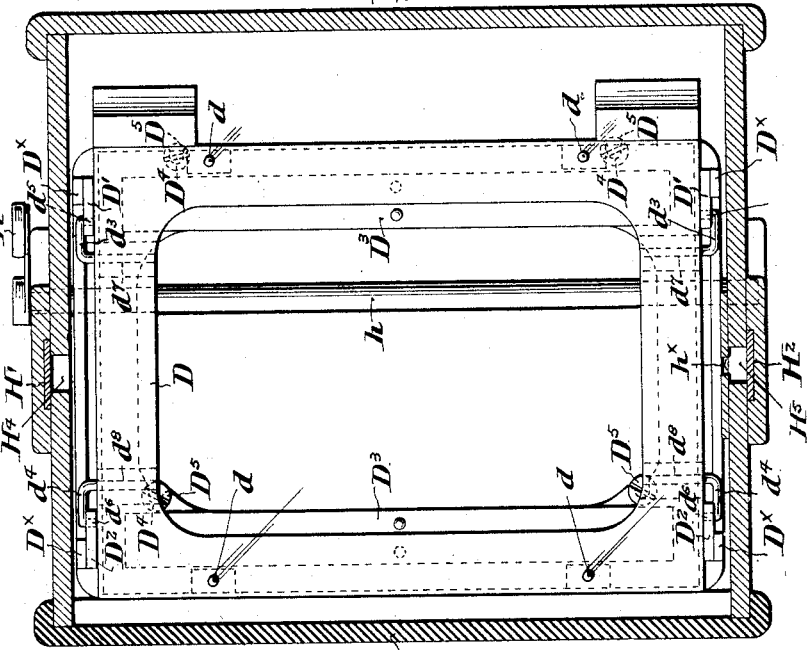
WITNESSES: INVENTOR:
A. J. Zahm WILLIAM H. DOERING,
F. C. Morley By A. E. Paege Atty.

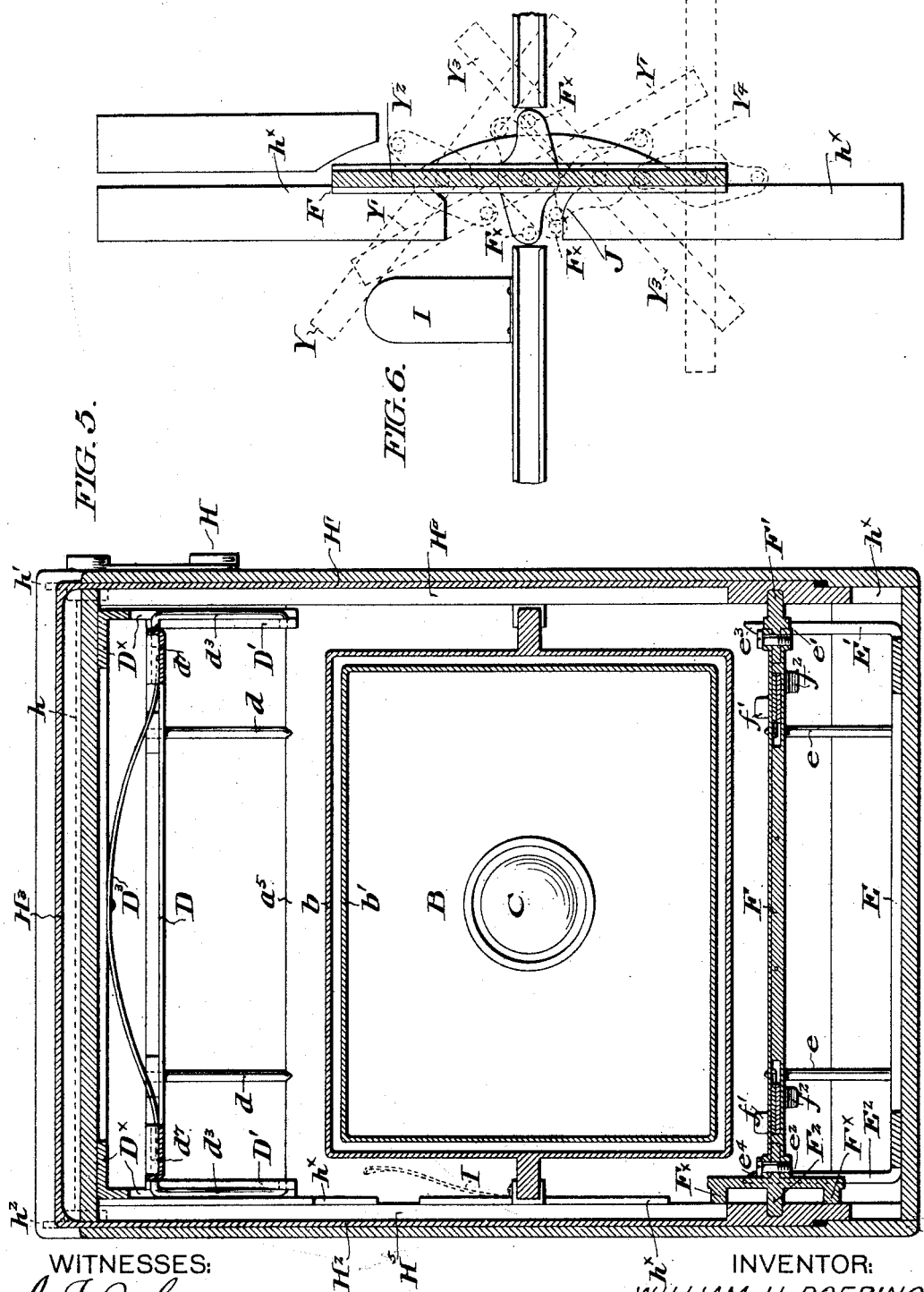

No. 621,447. Patented Mar. 21, 1899.
W. H. DOERING.
MAGAZINE CAMERA.
(Application filed Aug. 25, 1897.)

(No Model.) 8 Sheets—Sheet 4.

WITNESSES.
A. J. Zahm.
F. C. Morley.

INVENTOR:
WILLIAM H. DOERING,
By A. E. Pacy
Atty.

No. 621,447. Patented Mar. 21, 1899.
W. H. DOERING.
MAGAZINE CAMERA.
(Application filed Aug. 25, 1897.)
(No Model.) 8 Sheets—Sheet 5.
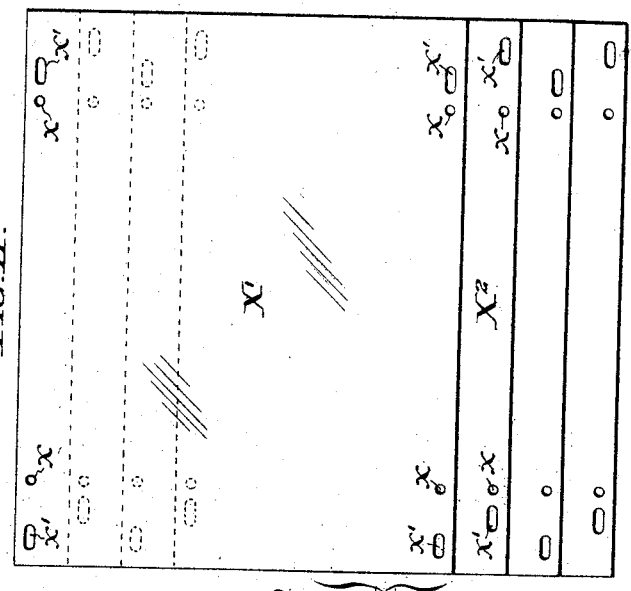
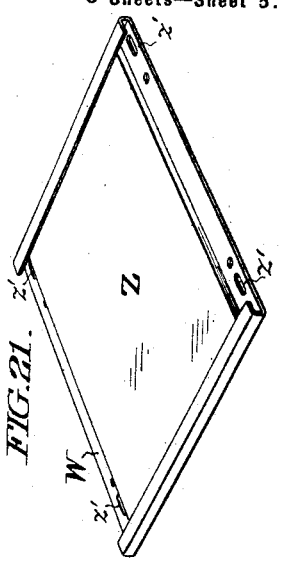
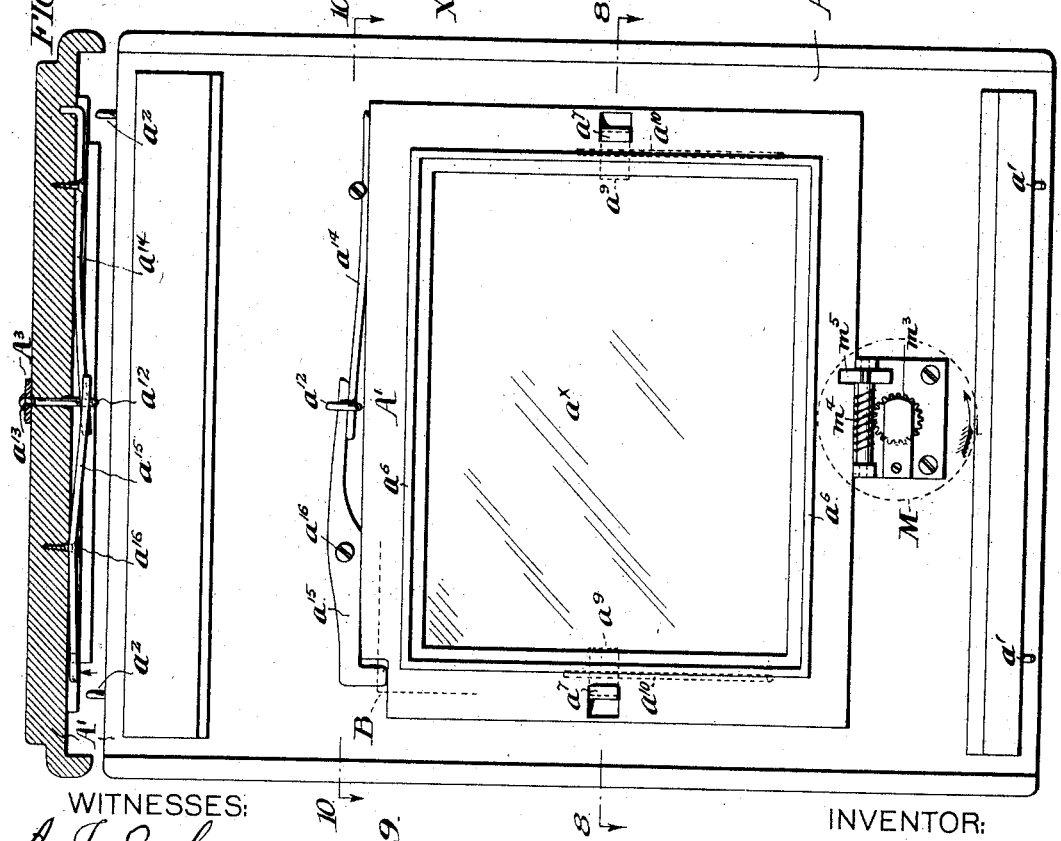
WITNESSES:
A. J. Zahm
F. C. Morley
INVENTOR:
WILLIAM H. DOERING,
By A. E. Paige
Atty.

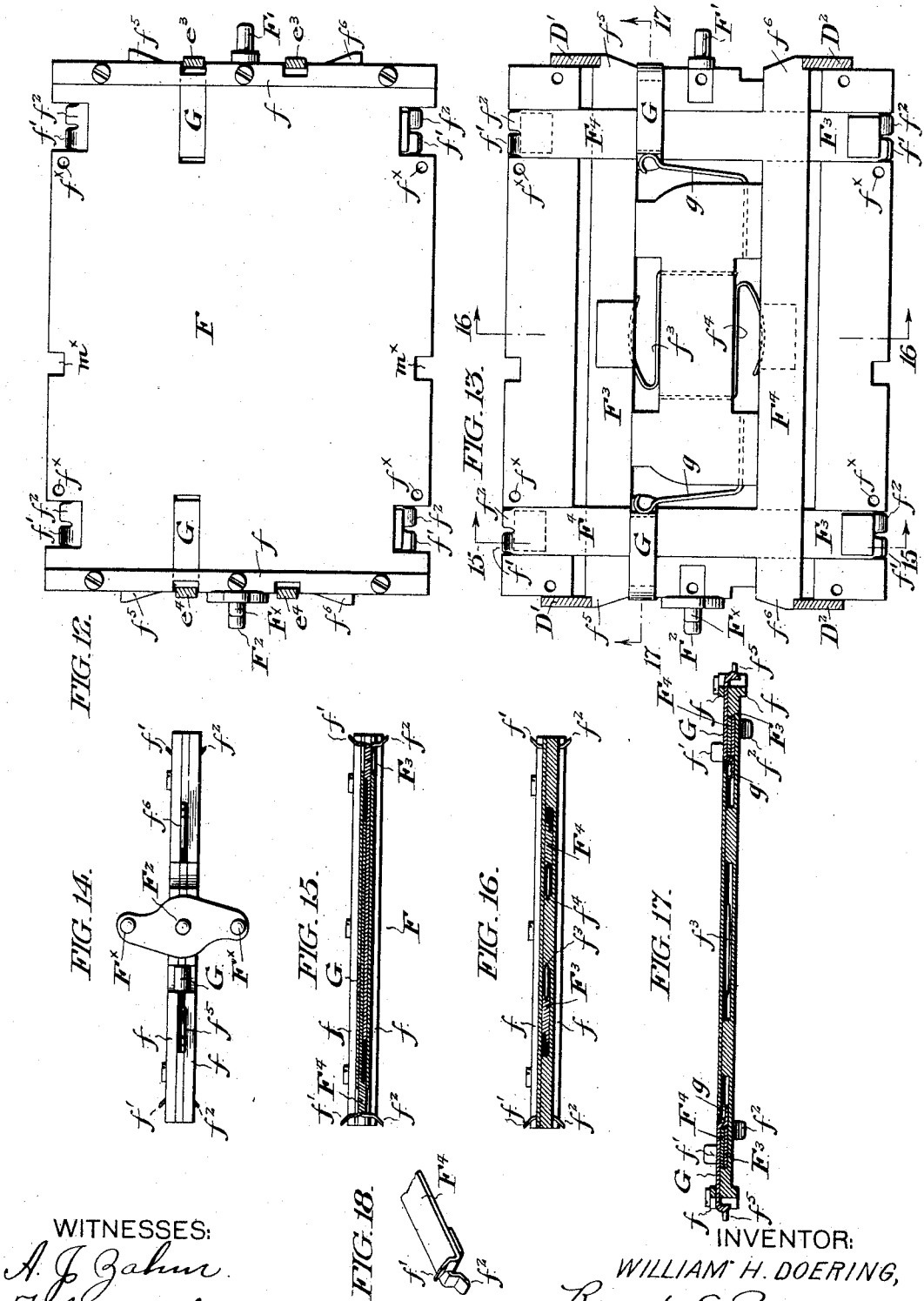

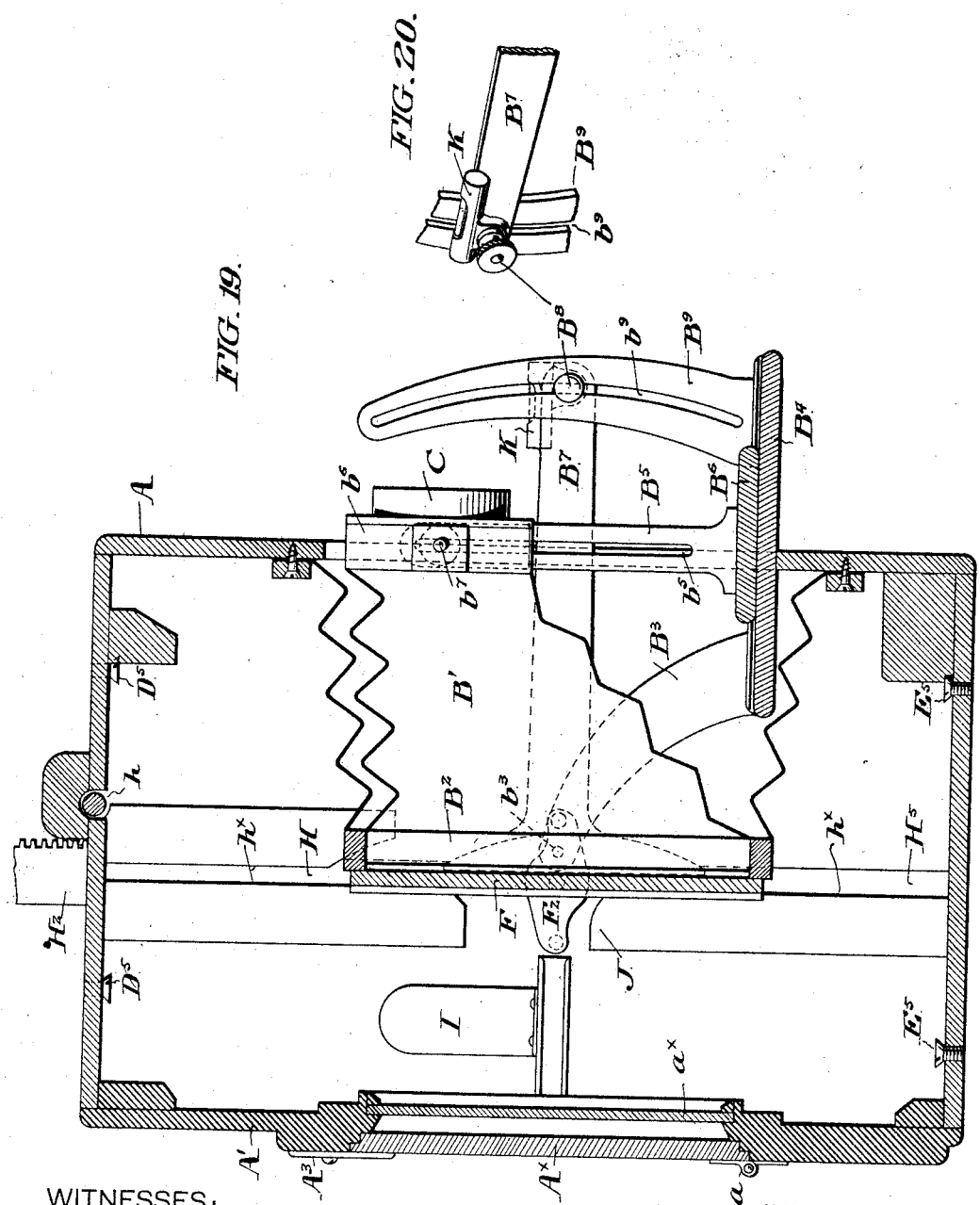

No. 621,447. Patented Mar. 21, 1899.
W. H. DOERING.
MAGAZINE CAMERA.
(Application filed Aug. 25, 1897.)
(No Model.) 8 Sheets—Sheet 8.
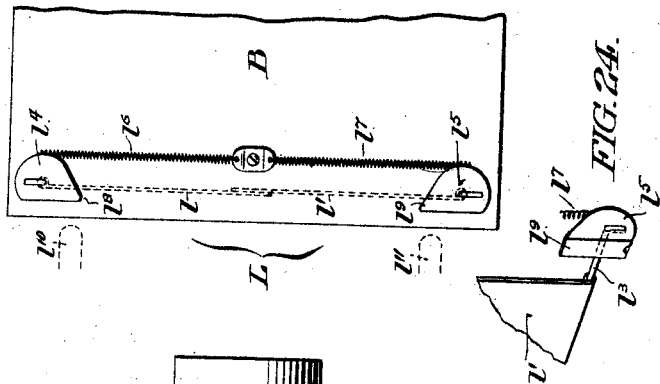
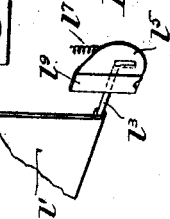
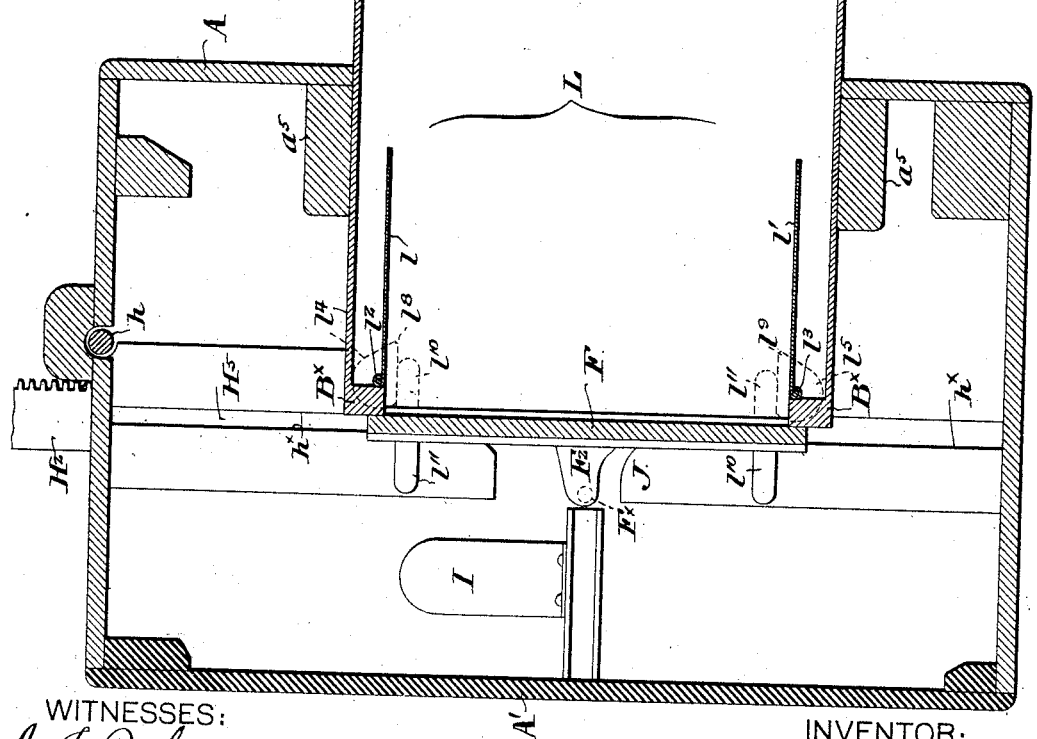
WITNESSES:
A. J. Zahm
F. C. Morley
INVENTOR:
WILLIAM H. DOERING,
By A. E. Paige
Atty.
THE NORRIS PETERS CO., PHOTO-LITHO., WASHINGTON, D. C.

UNITED STATES PATENT OFFICE.

WILLIAM H. DOERING, OF PHILADELPHIA, PENNSYLVANIA.

MAGAZINE-CAMERA.

SPECIFICATION forming part of Letters Patent No. 621,447, dated March 21, 1899.

Application filed August 25, 1897. Serial No. 649,452. (No model.)

*To all whom it may concern:*

Be it known that I, WILLIAM H. DOERING, of Philadelphia, in the State of Pennsylvania, have invented certain new and useful Improvements in Cameras, whereof the following is a specification, reference being had to the accompanying drawings.

My improvements are particularly related to cameras comprising a normally-closed plate-chamber adapted to contain unexposed and exposed plates in separate packs, the said chamber being provided with mechanism whereby said sensitized plates may be successively removed from the first pack, exposed behind a suitable lens, and stored in the second pack, said transposition of the plates being effected by manipulation of an exterior operating-handle connected with the said mechanism.

My invention comprises, first, a novel arrangement of the essential elements of such a camera to attain a maximum plate capacity within given exterior dimensions; second, mechanism to effect the transposition of plates within the camera; third, a plate-carriage provided with gripping mechanism whereby said plates may be manipulated with precision; fourth, certain useful adjunctive devices—such as an automatic lock connective of the cover of the focusing-glass and the focusing-tube, a swing-back for the focusing-tube, and an automatic shutter for the focusing-tube; fifth, indicating mechanism operated by the transposing mechanism, and, sixth, certain constructive features hereinafter described in detail.

Broadly speaking, the preferred embodiment of my invention comprises a camera-box provided with a removable back board and a focusing-tube which carries a suitable lens and is centrally mounted in said camera-box in such a manner as to be contained therein during the transportation of the camera and be extended therefrom during its operation, the said separate packs of unexposed and exposed plates being stored, respectively, above and below said focusing-tube and in planes parallel therewith. The camera is provided with mechanism to successively remove said plates from one of said packs, present them in a plane at right angles to the focal axis of the lens in the focusing-tube, and store the plates thus exposed in the second of said packs. Said mechanism being conveniently operated by an exterior handle, the operation of the camera does not require the removal of its back board. Said back board is conveniently removable for the insertion or removal of the said packs of plates.

The foregoing arrangement of the essential elements of the camera-box permits of the maximum length of the focusing-tube within a camera-box of given dimensions.

Figure 7:
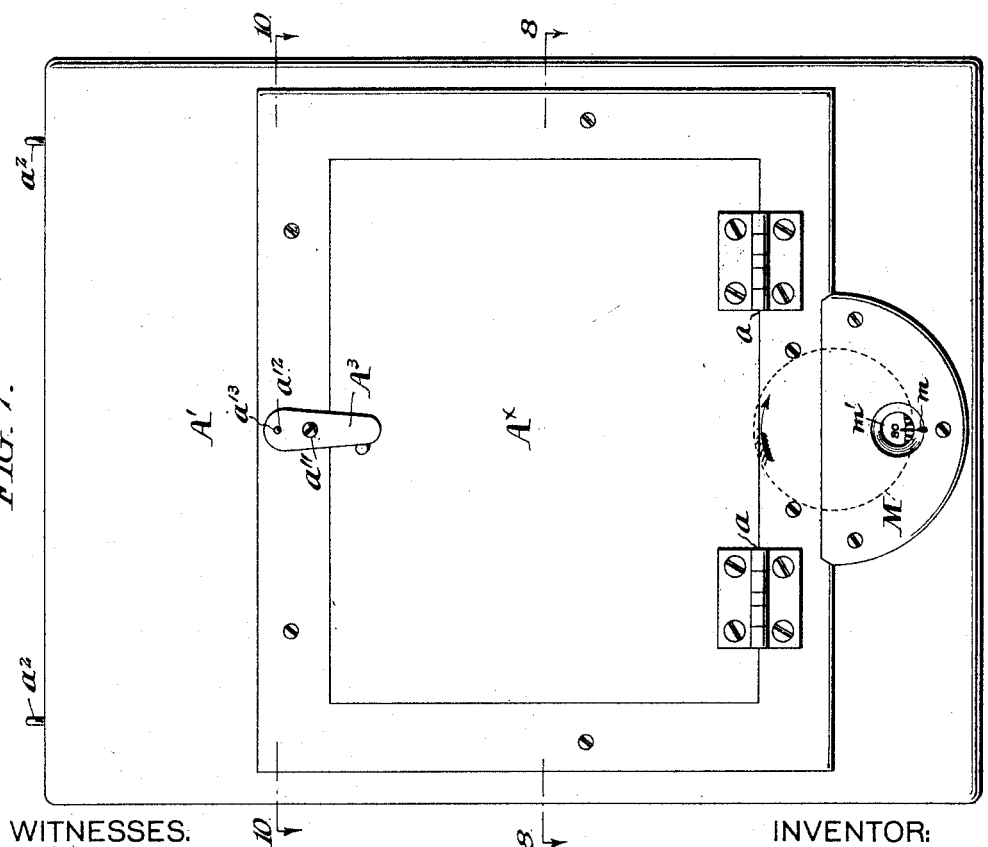

In the drawings, Figure 1 is a side elevation of a convenient embodiment of my invention. Fig. 2 is a central vertical longitudinal section of the same. Fig. 3 is an inverted plan section on the line 3 3 of Figs. 1 and 2. Fig. 4 is a plan section on the line 4 4 in Figs. 1 and 2. Fig. 5 is a vertical section on the line 5 5 of Fig. 1. Fig. 6 diagrammatically illustrates the movement of the plate-carriage, said view being a section of certain parts similar to that of Fig. 2. Fig. 7 is a rear elevation of the removable back board of the camera-box. Fig. 8 is a horizontal section through said back board on the line 8 8 of Fig. 7, showing the position of the automatic locking mechanism when the rear door is open. Fig. 9 is a front elevation of the back board. Fig. 10 is a plan section on the line 10 10 of Fig. 9. Fig. 11 illustrates the preferred arrangement of the sensitized plates. Fig. 12 is a plan view of the plate-carriage with its plate-gripping mechanism retracted. Fig. 13 is a plan view of the plate-carriage with the gripping mechanism extended, the top plate of the carriage being removed to better illustrate the interior mechanism. Fig. 14 is an edge view of the plate-carriage, showing the left-hand edge of Fig. 11. Fig. 15 is a section through the plate-carriage on the line 15 15 in Fig. 12. Fig. 16 is a section through the plate-carriage on the line 16 16 in Fig. 12. Fig. 17 is a section through the plate-carriage on the line 17 17 in Fig. 13. Fig. 18 is a fragmentary perspective view of a convenient form of plate-gripper. Fig. 19 is a sectional view in a plane corresponding to that of Fig. 2, showing a modified form of focusing-tube. Fig. 20 is a perspective view of the spirit-level shown in Fig. 19. Fig. 21 is a perspective view of a convenient form of holder for sensitized plates. Fig. 22 shows a simplified form of my invention, the same being a view in central vertical section. Figs. 23 and 24 show the details of construction of the automatic shutter shown in section in Fig. 22.

In said figures, A is the camera-box, provided with a removable back board A' for convenient access to its interior. The said back board A' is retained in normal position with relation to the box A by means of the pins $a'$ at the bottom of said board, which are entered in suitable sockets in the box A, the upper end of said board A' being provided with eyes $a^2$ to engage hooks $a^3$, pivoted at $a^4$ upon the box A.

An opening $A^2$ is provided in the front of the camera-box for the focusing-tube B, a suitable support for the latter being provided around said opening $A^2$, as indicated at $a^5$. The said focusing-tube is preferably made in two sections, as indicated in Fig. 2, the section $b$ being adapted to slide, light-tight, through the opening $A^2$. The section $b'$, upon which the lens C is mounted, is adapted to telescope within the section $b$.

When disposed for transportation, the telescopic focusing-tube B is contained within the outline of the camera-box, as indicated in Fig. 2. In said position the section $b$ is in contact with the back board A', a light-tight joint being made therewith by means of the projecting flange $a^6$ upon the latter.

The form of my invention shown in Fig. 2 is designed for use with a variable focus-lens. With such a lens it is of course necessary to provide means to ascertain the proper focal position of the parts. I have therefore provided a hinged door $A^\times$, covering a ground focusing-glass $a^\times$ in the back board A'.

The camera-box A is adapted to contain a store of unexposed plates above the focusing-tube B and a store of exposed plates below said tube, as hereinafter described, and during the operation of my device the focusing-tube B is shifted away from the back board A' and focusing-glass $a^\times$. Therefore it is necessary to provide means to prevent accidental ingress of light through said focusing-glass $a^\times$ when the said plates are uncovered by the shifting of the focusing-tube B. To this end I have provided mechanism whereby said focusing-tube is automatically secured in light-tight contact with said back board A' by the act of and previous to the actual opening of the focusing-door $A^\times$. The said mechanism also serves to prevent the opening of the door $A^\times$ when said focusing-tube B is not in such proper position.

I will now describe in detail the automatic mechanism, referring particularly to Figs. 2, 7, 8, and 9.

As shown in section in Fig. 8 the focusing tube-section $b$ is provided with notches $b^\times$. Said notches are adapted for engagement by hooks $a^7$ only when the tube $b$ is in light-tight contact with the back board A'. Said hooks $a^7$, which are pivoted at $a^8$, are, however, held out of engagement with the notches $b^\times$ when the door $A^\times$ is shut, the rearward extensions $a^9$ of the hooks $a^7$ being held forward against the action of the spring $a^{10}$ by the door $A^\times$ in said position of the parts. When, however, the door $A^\times$ is opened, as indicated in Fig. 8, the hooks $a^7$ being thereby released are forced into engagement with the notches $b^\times$ by the pressure of said springs $a^{10}$. The hooks $a^7$ of course serve to retain the focusing-tube B in light-tight contact with the back board A' until the door $A^\times$ is returned to its normal closed position.

As shown in Fig. 7, the door $A^\times$ is hinged at its lower edge to the back board A' at $a$, being retained in its closed position by the turn-button $A^3$, which is pivoted upon the back board A' at $a^{11}$. The said turn-button $A^3$ is secured in its normal position overlapping said door by means of the slide-bolt $a^{12}$, which enters an aperture $a^{13}$ in said turn-button.

As shown in Fig. 9, the slide-bolt $a^{12}$ is provided with a spring $a^{14}$, which tends to thrust it into engagement with the turn-button $A^3$.

In order to release the turn-button $A^3$ automatically when the tube B is in light-tight contact with the back board A', it is of course necessary that the slide-bolt $a^{12}$ be withdrawn against the pressure of its spring $a^{14}$, as indicated in Fig. 2. To effect this result, a bent releasing-lever $a^{15}$ is loosely mounted upon the screw-stud $a^{16}$, one end of said lever being engaged in the eye of the slide-bolt $a^{12}$. The opposite end of said lever is formed to project forward of the surface of the back board A' when the slide-bolt $a^{12}$ is entered in the turn-button $A^3$. When, however, the focusing-tube B is thrust into light-tight contact with the back board A', said tube contacts with the forwardly-extending end of the lever $a^{15}$, as indicated in dotted lines in Fig. 9, and, rocking said lever upon its stud $a^{16}$, withdraws the slide-bolt $a^{12}$, as indicated in Figs. 2 and 10.

It is obvious from the foregoing description of the parts and their coöperative relation that the door $A^\times$ may only be opened when the focusing tube-section $b$ is in proper position to exclude from the plates contained above and below the focusing-tube B the light coming through the ground glass $a^\times$. When said door is open, the proper focal position of the lens C in relation to the ground glass $a^\times$ may of course be determined by shifting the focusing tube-section $b'$, which carries the lens C, until a sharply-outlined image is projected upon the ground glass $a^\times$.

For simplicity of illustration I have omitted from the drawings the details of construction of the focusing-tube B. It is, however, obvious that it may be provided with the usual rack and set-screw or other device for obtaining the required adjustment with precision.

The ground glass $a^\times$ is so disposed that when the lens C is thus adjusted in proper focal position in the tube B with relation to said glass $a^\times$ it is in proper adjustment relative to the movable plate-carriage hereinafter described in detail.

Although I have described means to adjust the position of the lens C in the focusing-tube B, it is of course obvious that with a fixed focus-lens the proper position of said lens in the focusing-tube may be predetermined and said lens be mounted in fixed relationship with said tube. In such a construction it is of course unnecessary to provide means for inspecting the image projected by said lens. Therefore the door $A^\times$ and glass $a^\times$ may be omitted from the back board in such simplified construction. (See Fig. 22.)

In the embodiment of my invention which I have illustrated in the principal views the mechanism for successively exposing the store of plates is peculiarly adapted to manipulate flexible cut films. As shown in Fig. 11, the films X are each provided with four perforations $x$. By means of said perforations, which are adapted to register when the plates are assembled with their edges flush, said plates are retained in precise relation with the gripping mechanism hereinafter described. Each of the said films or plates is provided with a second group of four perforations $x'$, which serve to engage the gripping mechanism.

It will be observed by reference to Fig. 11 that when the openings $x$ are caused to register in the respective plates the openings $x'$ do not register, for the reason that although the openings $x'$ bear the same relation to each other in the respective plates, yet their relation to the openings $x$ differs in the alternate plates in the pack. Such an arrangement insures that the gripping mechanism which enters the openings $x'$ of one plate shall not enter the openings $x'$ of the next adjoining plate. Other means may of course be resorted to to prevent the taking of more than one plate by the gripping mechanism; but the arrangement illustrated is preferable because of its simplicity. It will be noticed that the pattern, so to speak, of apertures $x$ and $x'$ in each film or plate is the same. Therefore only one die is required to produce them, the staggered relationship being secured by merely reversing each alternating plate. For instance, the right-hand end of the top plate X' (illustrated in Fig. 11) is precisely similar to the left-hand end of the plate $X^2$ immediately beneath it. A number of plates X are thus alternately arranged, sensitive surface up, with their openings $x$ in registry and placed upon the plate-holder D, the four pins $d$, fixed upon said holder, entering the corresponding apertures $x$. The said pins $d$ being slightly larger in diameter than the apertures $x$, the friction between the pins and the edges of the apertures serves to maintain the pack in position until each plate is forcibly removed by the gripping mechanism hereinafter described. Said mechanism presents the plate thus removed in proper position for exposure behind the lens C and focusing-tube B and then deposits it upon the plate-holder E, which is provided with pins $e$ to engage the apertures $x$ in a manner similar to the pins $d$ aforesaid.

In order that the coöperation of the various parts may be better understood, I will first describe the construction of the plate-carriage F. Referring to Fig. 2, in which said plate-carriage is shown in its normal position in relation to the camera-box, and to Figs. 12 to 18, inclusive, wherein its detailed construction is illustrated, the plate-carriage F comprises a body portion having two opposite plane faces similarly adapted to support alternate films or plates X. Said carriage F is provided with trunnions F' and $F^2$, upon which it is adapted to rotate, as hereinafter described. The holes $f^\times$, extending through the carriage F, merely afford clearance for the pins $d$ and $e$ aforesaid. Both faces of the plate-carriage F are provided with edge flanges $f$, the space between said flanges $f$ being just sufficient to receive the length of a plate X. One face of the plate-carriage F is provided with four grippers $f'$, the opposite face of the plate-carriage being provided with four grippers $f^2$. The said grippers consist of outwardly-extending sheet-metal lugs. (Best shown in Figs. 15 and 18.) The grippers $f'$ and $f^2$, projecting, respectively, from the opposite faces of the plate-carriage F, are so related that when said carriage is alternately presented to the pack of plates upon the holder D said grippers $f'$ are adapted to successively engage plates having openings $x'$ disposed in relation to the apertures $x$, as in the top plate X' of Fig. 11, the grippers $f^2$ being adapted to successively engage plates having openings $x'$ disposed as in plate $X^2$ in said figure.

As indicated in Figs. 15 and 16, the grippers incline outwardly. In their normal position said grippers are retracted, as indicated in Figs. 12 and 14. In said position the distance from tip to tip of said grippers is such as to permit them to enter the slots $x'$, with which they are in line when thrust against the pack. In order that said grippers shall engage the plate, the openings $x'$ of which are thus entered, means are provided to extend the said grippers to the position indicated in Figs. 13 and 15. In so doing the plate with which they are engaged is drawn down upon the carriage. The peculiar shape of the grippers serves to prevent the accidental displacement of a plate so secured. The extension of the grippers thus described is conveniently effected as follows: As shown in Fig. 13, the gripping mechanism comprises two frames $F^3$ and $F^4$. Each of said frames carries the four grippers of its respective side, two $f'$ and two $f^2$. The said frames overlap each other and are respectively provided with springs $f^3$ and $f^4$, which serve to normally retract said frames, as indicated in Figs. 2 and 12. The frame $F^3$ being provided with two lugs $f^5$ and the frame $F^4$ with similar lugs $f^6$, which oppositely project beyond the edge flanges $ff$ of the plate-carriage F, the extension of the grippers aforesaid is effected by the engagement of the aforesaid lugs with the plates D' and $D^2$. (Best shown in Fig. 2.) Said plates are provided with oppositely-inclined slots $d'$ and $d^2$ and are mounted upon fixed studs $d^\times$, which project inwardly from the depending sides of the supporting-frame $D^\times$. The links $d^3$ and $d^4$, which are pivoted at their lower ends $d^5$ and $d^6$ to the slotted plates D' and $D^2$ and are likewise pivoted at their upper ends to the plate-holder D at $d^7$ and $d^8$, respectively, serve to maintain said plates in vertical position. The flat springs $D^3$, which are secured upon the frame $D^\times$, press upon the plate-holder D and normally hold it in the position indicated in Fig. 2, the pressure of the springs $D^3$ upon the plate-holder D being communicated by the links $d^3$ and $d^4$ to the slotted plates D' and $D^2$, thrusting the latter downwardly to the limit of their slots.

When in the operation of the camera the plate-carriage F is thrust upward against the films X, supported upon the plate-holder D, the latter yields, compressing the springs $D^3$. Said action is continued until the studs $d^\times$ encounter the lower ends of the slots in the respective plates D' and $D^2$. It is obvious that as the studs $d^\times$ are fixed upon the depending sides of the frame $D^\times$ all movement of the slotted plates D' and $D^2$ must be in a diagonal direction corresponding to the angle of said respective slots $d'$ and $d^2$. The relation of the plates D' and $D^2$ to the plate-carriage F is such that the lugs $f^5$ and $f^6$, projecting from the overlapping gripping-frames $F^3$ and $F^4$, extend between the opposed slotted plates D' and $D^2$, and therefore by the converging upward movement of said plates said frames are extended into the position indicated in Fig. 13. Said movement is of course against the pressure of the springs $f^3$ and $f^4$ of said gripping-frames. The inclined ends of the grippers having entered the corresponding slots in the proximal film or plate upon the plate-holder D, the aforesaid extension of the gripping-frames serves to draw said plate away from the pack and into contact with the plate-carriage F.

It is obvious that if the plate-carriage F were withdrawn and freed from the slotted plates D' and $D^2$ said frames $F^3$ and $F^4$ would be returned to their normal position by the pressure of said springs $f^3$ and $f^4$ and the plate just gripped would be immediately released. To prevent such reverse action of the gripping-frames, I provide latches G, which are thrust into notches in the sides of said frames $F^3$ and $F^4$ by means of springs $g$, when the frames are in their extended position.

The vertical movement of the plate-carriage F is conveniently effected by means of the operating-handle H. Said handle is secured upon the end of a shaft $h$, mounted for rotation in the camera-box A and provided with pinions $h'$ and $h^2$, engaged in racks H' and $H^2$, mounted for reciprocation in the side of the box A. Said racks are rigidly connected at their upper extremities by the bar $H^3$ and are provided at their lower extremities with bearings for the trunnions F' and $F^2$ of the carriage F, entered through respective slots $H^4$ and $H^5$ in the box A.

In the above-described upward movement of the plate-carriage its accidental rotation upon its trunnions F' and $F^2$ is prevented by means of the projecting studs $F^\times$ upon the plate of the trunnion $F^2$, said studs being engaged by the edge $h^\times$ of the trunnion-slot $H^5$ in the side of the camera-box A.

After the plate has been secured upon the plate-carriage F by the extension of the gripping-frames, as above described, reverse rotation of the handle H and shaft $h$ serves to lower the plate-carriage and free the plate from the pins $d$ of the holder D.

Referring to Figs. 5 and 6, I is a flat spring suitably secured upon the side of the camera-box A in such a position as to extend within the path of travel of the carriage F. The shape of said spring is such as to cause it to be thrust aside by the upward movement of said carriage. In its downward movement said carriage F is, however, caught upon the rounded top of the spring I, and by the further lowering of the racks H' and $H^2$, in which said carriage has its bearings, said carriage is successively tilted into the positions indicated by the dotted lines in Fig. 6 at Y Y', &c. In order to permit such tilting action of the carriage, the edge pieces $h^\times$ of the slot $H^5$ are cut away, as indicated in said figure, thus giving clearance for the studs $F^\times$ upon the plate of the trunnion $F^2$.

The plate-carriage F is stopped in its downward movement with its trunnions in line with the center of the focusing-tube B and is by the backward movement of the latter brought into light-tight contact with the rear extremity of said tube. The film or plate upon said carriage is then exposed to the image projected from the lens C, said lens being of course provided, as usual, with devices for controlling said exposure, such as a shutter or cap. After the exposure the focusing-tube B is again advanced, freeing the carriage F. Said carriage is then lowered by rotation of the handle H, as aforesaid. By said movement the stud $F^\times$ to the left of Fig. 6 is brought into contact with a cam or incline J. Said stud follows the contour of the upper edge of said cam J, serving to rotate the carriage into the successive positions indicated by the dotted lines at $Y^3$ and $Y^4$, respectively. It will thus be noticed that the plate which has thus been shifted and exposed was originally secured, sensitized face up, upon the plate-holder D, was presented with its sensitized face toward said lens C, as shown at $Y^2$, and in the position indicated at $Y^4$ presented with its sensitized face downward. It only remains to deposit said plate upon the pins $e$ of the plate-holder E, which is effected as follows: Upon the opposite sides of said plate-holder E are plate-releasing lugs E' and E$^2$. The shoulders $e'$ and $e^2$ of the respective lugs E' and E$^2$ serve as stops to limit the downward movement of the plate-carriage F. As shown in Fig. 2, the pins $e$ extend through the plate-carriage F when the latter is at rest upon the said shoulders $e'$ and $e^2$. Said lugs E' and E$^2$, which extend vertically from the bed-plate of said holder E, terminate in oppositely-inclined projections $e^3$ and $e^4$ in line with the outer ends of the latches G upon the plate-holder F. The said latches are by the descent of the carriage thrust inward by said inclined projections and disengage the frames F$^3$ and F$^4$. The springs $f^3$ and $f^4$ thereupon return said frames to their normal retracted position, as indicated in Figs. 2 and 12, thus releasing the exposed plate upon the carriage F. The said plate is retained by the friction of contact upon the pins $e$ of the plate-holder E, when said carriage is again lifted by rotation of the handle H.

By the plate-transposing mechanism above described the individual plates X of a pack originally placed upon the plate-holder D and secured thereon by friction of the edges of their respective apertures $x$ upon the pins $d$ may be thus successively removed, exposed, and deposited upon the pins $e$ of the plate-holder E, the last deposited plate X serving to thrust the previously-deposited plates farther downward upon the pins $e$ until the limit of capacity of said plate-holder E is reached. For convenience of insertion of said packs of unexposed and exposed plates both of the plate-holders D and E are removable from the camera-box. As indicated in Fig. 3, the frame D$^\times$ of the plate-holder D is provided with suitable notches D$^4$ to engage the screws D$^5$, the heads of which serve to retain the frame D$^\times$ in proper position in the camera-box. When, however, the back-board A' is removed said frame D$^\times$, together with the plate-holder D and its connected parts, may be slid rearwardly out of engagement with said screws D$^5$ and removed from the camera-box. As indicated in Fig. 4, the plate-holder E is likewise provided with notches E$^4$, adapted to engage upon screws E$^5$ and removable in the manner just described.

In the form shown in Fig. 19 the focusing-tube B' comprises a flexible bellows provided with a swing-back frame B$^2$, pivotally mounted at $b^3$ in the brackets B$^3$, the latter being fixed upon the slide B$^4$. Said back frame B$^2$ serves to contact with the plate-holder F. The construction shown in Fig. 19 differs from that hitherto described in that the lens C is adapted for vertical adjustment with respect to the camera-box, the front board $b^6$, which supports the lens C, being provided with clamp-screws $b^7$, entered through the slots $b^5$ in the brackets B$^5$, said clamp serving to secure said lens in its adjusted position.

The swing-back frame B$^2$ is provided with a rigid arm B$^7$, whereby it may be secured in angular relation with the camera-box A by the clamp B$^8$, entered through the slot $b^9$ in the bracket B$^9$, which is fixed upon the slide B$^4$.

That the operator may conveniently adjust the swing-back frame B$^2$ in vertical position the arm B$^7$ is provided with a spirit-level K. (Best shown in Fig. 20.)

Although I have shown and described the foregoing gripping mechanism as adapted for direct engagement upon flexible plates, it is obvious that said mechanism is adapted to engage carriers W for rigid plates Z if said carriers W are provided with suitable apertures $z'$, as indicated in Fig. 21.

If the tube of the lens C remains uncovered by its ordinary shutter or cap during the manipulation of my invention which is preparatory to the proper exposure of the plate, it is of course possible to fog all of the plates in the camera to which light entering under such circumstances would have access. I therefore prefer to provide an automatic shutter L for said lens, as indicated in Fig. 22 and shown in detail in Figs. 23 and 24. Said shutter L comprises two flaps $l$ and $l'$, respectively, provided with spindles $l^2$ and $l^3$. Said spindles are mounted for oscillation in the back frame B$^\times$ and are conveniently provided upon the outside of said frame with sectors $l^4$ and $l^5$, respectively. Each of said sectors is provided with a spring $l^6$ and $l^7$, respectively, said springs serving to maintain the flaps $l$ and $l'$ normally in closed position. The sectors $l^4$ and $l^5$ are respectively provided with projecting lugs $l^8$ and $l^9$. In the normal position of the parts—$i.\ e.$, with the automatic shutter L closed, as indicated in Fig. 23—the lugs $l^8$ and $l^9$ are presented in the position indicated in said figure, so that in the contact of the back board B$^\times$ with the plate-carriage F said lugs are engaged, respectively, by projections $l^{10}$ and $l^{11}$ upon said plate-carriage, and are thereby deflected into their opened position, as shown in Fig. 22.

It is obvious that the aforesaid construction and relation of the parts of the shutter L are such that said shutter will automatically close by the action of said springs whenever the focusing-tube B and its back frame B$^\times$ are separated from the plate-carriage F, thus obviating accidental exposure of all the plates to the light entering through the lens C when said lens is carelessly left uncapped during the operation of shifting the plate-carriage F.

For the reason that all of the manipulation of the sensitized plates is effected by means of the exterior handle H it is desirable to provide an indicator by which the number of plates exposed and deposited upon the plate-holder E may be ascertained.

I am aware that it is not new in magazine-cameras to provide indicating mechanism which records the successive rotations of an exterior operating-handle. Such an arrangement is, however, inconvenient for the reason that each movement of the operating-handle is indicated whether such movement has resulted in the exposure of a plate or not. The indicating mechanism which I am about to describe is advantageous in that it may only be shifted when a plate has actually passed the position of exposure to be deposited upon the holder E.

Referring to Figs. 2, 7, and 9, it will be seen that said mechanism comprises a graduated disk M and a fixed index $m$ upon the exterior of the casing at the margin of an opening $m'$, through which said graduations are visible. The disk M is fixedly mounted upon a shaft $m^2$, to which is also affixed a worm-gear $m^3$. Said gear $m^3$ is mounted in engagement with a worm $m^4$. The star-wheel $m^5$ is fixed upon the shaft of the worm $m^4$ and serves to rotate the latter. As shown in Fig. 2, the normal position of said star-wheel is with one of its points projecting horizontally within the path of traverse of the plate-carriage F. In said position of the parts one of said graduations upon the disk M is precisely in line with the index $m$ upon the casing. Said star-wheel is not, however, rotated by contact with the plate-carriage F, the latter being provided with notches $m^\times$ upon its opposite edges, so as to clear said star-wheel. When, however, the carriage F is shifted past the star-wheel $m^5$ with a sensitized plate upon it, said plate extends over said notch $m^\times$ in position to contact with the star-wheel $m^5$ and in its downward passage to rotate said star-wheel, worm, and disk one point.

It is obvious that by the foregoing arrangement of the parts said plate-carriage F may be shifted freely in its cycle of movement without affecting the indicating mechanism except when a plate is actually carried below said mechanism and deposited upon the holder E.

I do not desire to limit myself to the precise construction which I have shown and described, as it is obvious that many modifications may be made therein as convenience may dictate.

I claim—

1. In a photographic-plate magazine, the combination of separate holders for unexposed, and exposed plates, a focusing-tube inserted in said magazine between said holders, and plate-transposing mechanism rendered operative by the withdrawal of said tube, substantially as set forth.

2. In a camera, the combination of, a normally-closed plate-chamber, adapted to contain unexposed and exposed plates in separate holders, in planes parallel with its focal axis, a focusing-tube mounted for telescopic reciprocation in said plate-chamber, between said unexposed and exposed plates, means to shift said plates from the first of said holders to a plane behind said focusing-tube, and at right angles thereto, substantially as set forth.

3. In combination, a camera-box, a lens, a movable focusing-tube for said lens, a focusing-glass, a cover for said glass, an automatic lock for said cover, and means to automatically release said lock when said focusing-tube is brought into light-tight relation with said focusing-glass, substantially as set forth.

4. In combination, a camera-box, a lens, a movable focusing-tube for said lens, a focusing-glass, a cover for said glass, a lock connective of said tube and glass, and means to automatically release said lock when said cover is brought into light-tight relation with said focusing-glass, substantially as set forth.

5. In combination, a camera-box, a lens, a movable focusing-tube for said lens, a swing-back for said focusing-tube, a pivoted plate-carriage, a holder for unexposed plates, a holder for exposed plates, and mechanism to transpose a plate, by said pivoted carriage, from the first of said holders to a position parallel with the swing-back of said focusing-tube, for the exposure of said plate, and from said exposed position to the second holder aforesaid, substantially as set forth.

6. In combination, a camera-box, a holder for unexposed plates, a holder for exposed plates, a pivoted plate-carriage, mechanism for shifting said plate-carriage from the first to the second of said holders, and means to partly rotate said plate-carriage during its traverse, substantially as set forth.

7. In combination, a camera-box, a pack of alternately-disposed unexposed plates, a pivoted plate-carriage, opposite plane faces upon said plate-carriage, mechanism for alternately presenting the respective faces of said carriage to said alternately-disposed plates in the pack, and gripping mechanism upon said carriage to engage said plates, substantially as set forth.

8. In combination, a camera-box, a holder for unexposed plates, a holder for exposed plates, a pivoted plate-carriage, mechanism for shifting said plate-carriage from the first to the second plate-holder, plate-grippers upon said carriage, mechanism to actuate said grippers in connection with the first plate-holder, and mechanism to release said grippers in connection with the second plate-holder, substantially as set forth.

9. In combination, a camera-box, a holder for unexposed plates, a holder for exposed plates, a pivoted plate-carriage, mechanism for shifting said plate-carriage from the first to the second of said plate-holders, comprising toothed racks, bearings in said racks for said plate-carriage, a pinion-shaft, pinions upon said shaft adapted to engage the respective racks, and an operating-handle for said shaft, substantially as set forth.

10. In combination, a camera-box, a holder for unexposed plates, a holder for exposed plates, a pivoted plate-carriage, mechanism for shifting said plate-carriage from the first to the second of said plate-holders, opposed gripping-frames upon said carriage, gripper-lugs upon said frames, springs to retract said opposed gripping-frames, mechanism in connection with the first of said plate-holders to extend said gripping-frames, latches upon said carriage to engage said opposed frames in extended position, and mechanism in connection with the second of said plate-holders to disengage said latches, and release said opposed frames, substantially as set forth.

11. In combination, a camera-box, a removable holder for unexposed plates, a removable holder for exposed plates, a pivoted plate-carriage, opposite plane faces upon said plate-carriage, mechanism for shifting said plate-carriage from the first to the second of said plate-holders, mechanism for rotating said pivoted plate-carriage, opposed gripping-frames upon said carriage, gripper-lugs upon said frames, projecting from each of said opposite plane faces, springs to retract said opposed gripping-frames, mechanism in connection with the first of said plate-holders, to extend said gripping-frames, latches upon said carriage to engage said frames in extended position, and mechanism in connection with the second of said plate-holders to disengage said latches and release said frames, substantially as set forth.

12. In a magazine-camera the combination with a camera-box, of a pivoted plate-carriage mounted within said box, mechanism to shift said plate-carriage, a focusing-tube, and a pivoted back board for said focusing-tube, whereby the angular adjustment of said pivoted plate-carriage and pivoted back board is permitted, substantially as set forth.

13. In combination, a camera-box comprising a normally-closed plate-magazine, a focusing-tube mounted for longitudinal movement in said box, and shutter mechanism operated by the longitudinal movement of said focusing-tube, substantially as set forth.

14. In combination, a camera-box comprising a normally-closed plate-magazine, a plate-carriage, a shutter L, to exclude the light from said magazine, and means adapted to connect said plate-carriage and said shutter, to automatically operate the latter, substantially as set forth.

15. In a photographic-plate magazine, the combination with a pack of alternately-slotted plates, of plate-transposing mechanism comprising means to engage the respective alternately-disposed plate-slots in succession, substantially as set forth.

16. In a photographic-plate magazine, the combination with a plate-holder, of means, in said holder, to retain a pack of plates, in said holder, by frictional engagement with the respective plates, of said pack, substantially as set forth.

17. In a photographic-plate magazine, the combination with a plate-holder, of means to retain a pack of plates upon said holder by frictional engagement with the respective plates of said pack, and plate-transposing mechanism to successively disengage said plates from said holder, substantially as set forth.

18. In a photographic-plate magazine, the combination with a plate-holder, of a plurality of pins to retain a pack of plates upon said holder by frictional engagement with the respective plates in said pack, substantially as set forth.

19. In a photographic-plate magazine, the combination with a plate-holder, of means to retain a pack of plates by frictional engagement in apertures of the respective plates of said pack, substantially as set forth.

20. In a photographic-plate magazine, the combination with an apertured photographic plate, of a plate-holder comprising means for detachable engagement in the apertures of said plate, substantially as set forth.

21. In a photographic-plate magazine, the combination with a flexible photographic plate, provided with apertures in its body, of a plate-holder provided with means to detachably engage the apertures in the body of said flexible plate, substantially as set forth.

22. In combination, a series of photographic plates each provided with a plurality of slots, the adjoining plates being alternately disposed so that the slots of each plate are opposed by unslotted portions of the adjoining plate, substantially as and for the purpose set forth.

23. In combination, a series of photographic plates each provided with a plurality of apertures, the apertures of the respective plates being in registry throughout the series, each of said plates being provided with a plurality of slots, the adjoining plates being alternately disposed so that the slots of each plate are opposed by unslotted portions of the adjoining plate, substantially as and for the purpose set forth.

24. In a magazine-camera, the combination with separate holders for unexposed and exposed plates, of mechanism to transpose the plates from one of said holders to the other, an indicator, and means adapted to connect said transposing mechanism and said indicator, whereby the indicator is automatically actuated in the transfer of a plate from one of said holders to the other; and the idle traverse of said transposing mechanism from one of said holders to the other, in both directions is permitted, without actuation of said indicator, substantially as set forth.

WILLIAM H. DOERING.

Witnesses:
A. E. PAIGE,
E. L. FULLERTON.